Figure 1:
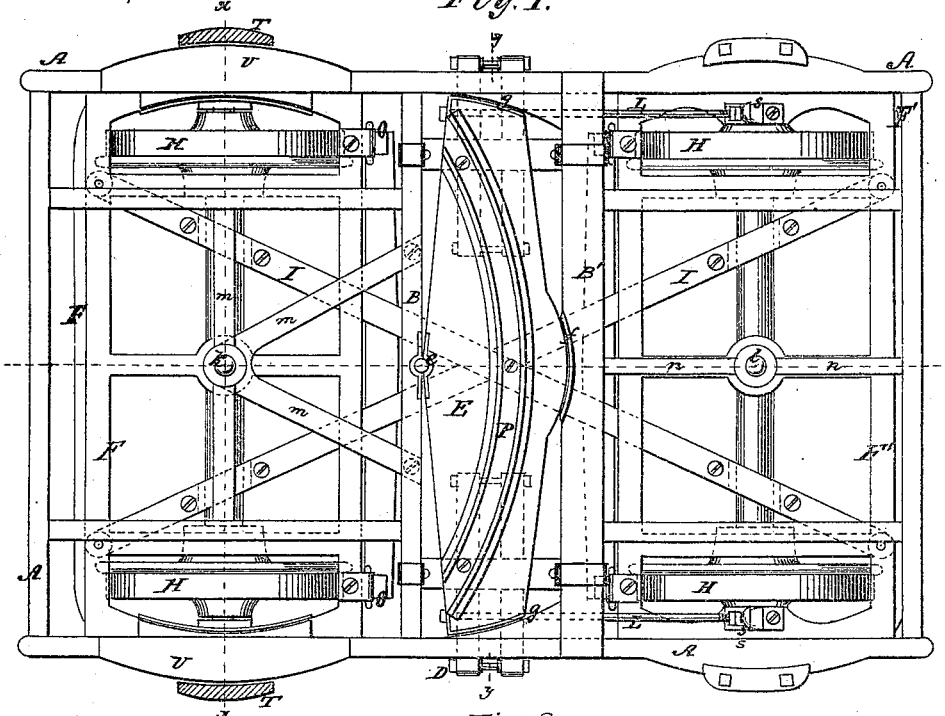

2 Sheets--Sheet 1.

W. YOUMANS.
Improvement in Railroad Cars and Trucks.
No. 133,001. Patented Nov. 12, 1872.

Witnesses:
J. Felbel
E. Wolff

Inventor:
Walter Youmans
By his attorney
J. N. McIntire

2 Sheets--Sheet 2.

W. YOUMANS.
Improvement in Railroad Cars and Trucks.
No. 133,001. Patented Nov. 12, 1872.

Witnesses:
J. Felbel.
E. Wolff.

Inventor:
Walter Youmans
By his attorney
J. N. McIntire.

UNITED STATES PATENT OFFICE.

WALTER YOUMANS, OF LANSINGBURG, NEW YORK.

IMPROVEMENT IN RAILROAD CARS AND TRUCKS.

Specification forming part of Letters Patent No. 133,001, dated November 12, 1872.

*To all whom it may concern:*

Be it known that I, WALTER YOUMANS, of Lansingburg, in the State of New York, have invented certain new and useful Improvements in Railroad Cars and Trucks; and I do hereby declare that the following is a full and exact description thereof, reference being had to the accompanying drawing making part of this application.

Previous to my invention numerous modes of construction of the truck and various methods of combining it with the platform or body of the car have been suggested, all having for their main object to render the car and truck capable of very readily turning curves with the least possible amount of strain and wear on the car and road, and with the greatest degree of comfort to the passengers. In the accomplishment of these ends it is necessary that the truck be so constructed that its axles may automatically assume and maintain positions at right angles to the line of the track when running on straight portions thereof, and positions corresponding to the radiuses of the circular portions of the track when running on the "curves;" and that while capable of this automatic adjustment of the axles to the lines of direction of the track the truck shall be so combined and arranged with the platform or body of the car as to avoid, as far as possible, that lateral vibration of the car which is so disagreeable to passengers, injurious to the car, and often very dangerous. To produce a truck sufficiently strong and durable without complication of mechanism, and at the same time embodying the requisite capacities alluded to, has been a problem the solution of which, though apparently simple in theory, has been found difficult in a practical sense. I propose, by my invention, to produce a car-truck and car which, while perfectly simple, durable, and practically successful in operation, shall embody the great requisites alluded to and heretofore aimed at by many suggested and patented modes of construction. The several distinct features of construction by which my invention may be distinguished from others, and in which my improvements rest, are: First, the capacity of the truck-frame to oscillate about a vertical axis of motion which is coincident with the axis about which the front axle-tree swivels, and the combination of the truck with the platform in such a manner that the latter shall tend to induce such oscillation of the truck when striking a curve, all as hereinafter more fully explained. Second, the combination of the axle-boxes and the jaws in which they are held with auxiliary frame so pivoted beneath the truck-frame that the said jaws, boxes, and axles may be swiveled about said pivots, all as hereinafter more fully explained. Third, the combination of the rear auxiliary axle-frame with the oscillating center-bar, so that the latter shall tend to impart motion to the former, as will be hereinafter more fully explained. Fourth, the combination, with the front and rear axle-frames, which oscillate upon axes of motion different from that of the truck-frame, of a suitable connecting frame-work or pivoted bars in such a manner that any oscillation of one of said frames shall be imparted to the other, as hereinafter more fully explained. Fifth, the use, in connection with the front and rear auxiliary and swiveling frames, of connecting bars, (for imparting the motions of one to the other of said frames,) which extend beyond the axles, as hereinafter more fully explained.

To enable those skilled to more fully understand and practice my invention, I will now describe, by reference to the accompanying drawing, the construction and operation of a car embracing the improvements alluded to.

Figure 2:
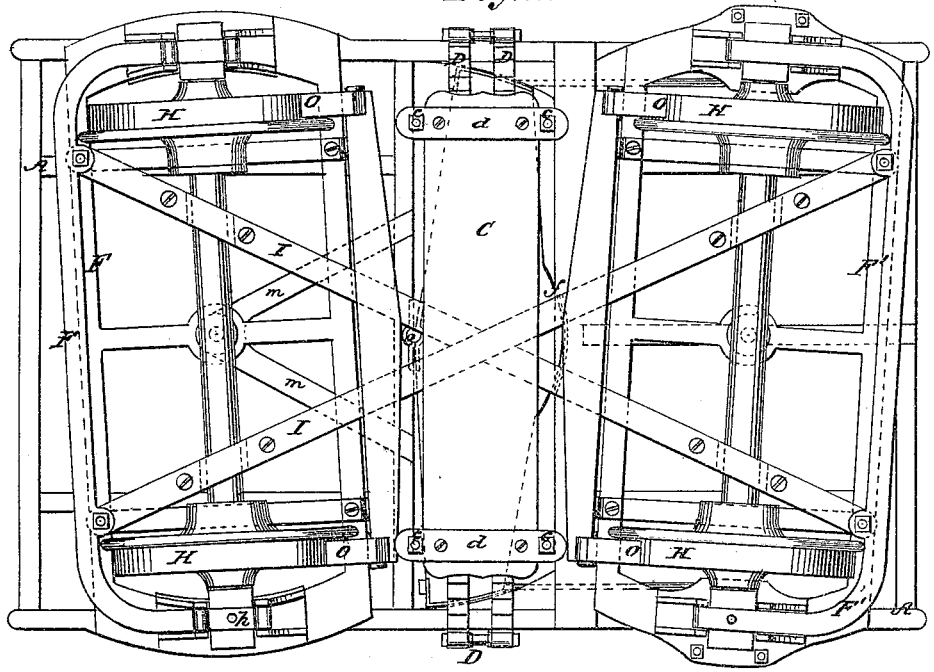
Figure 3:
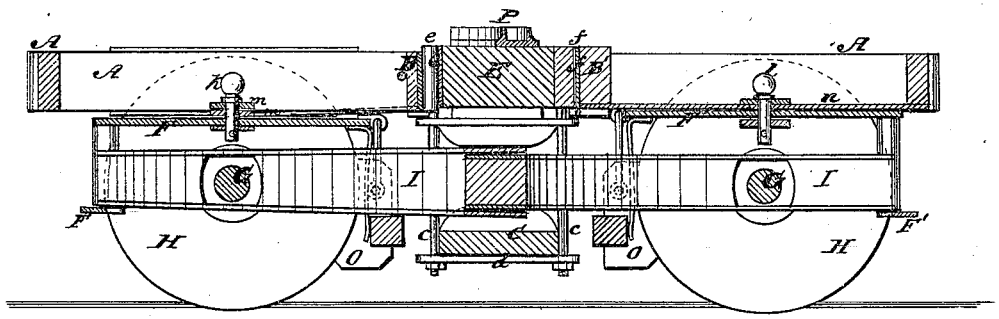
Figure 5:
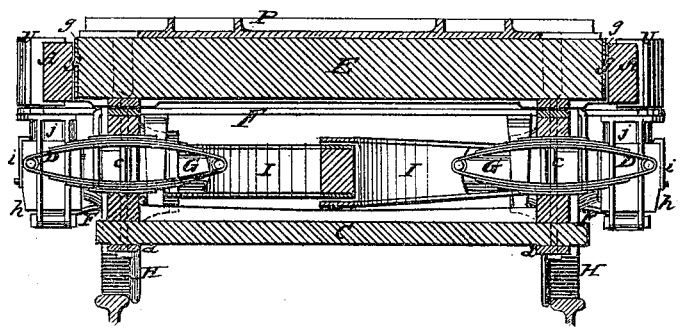
Figure 4:
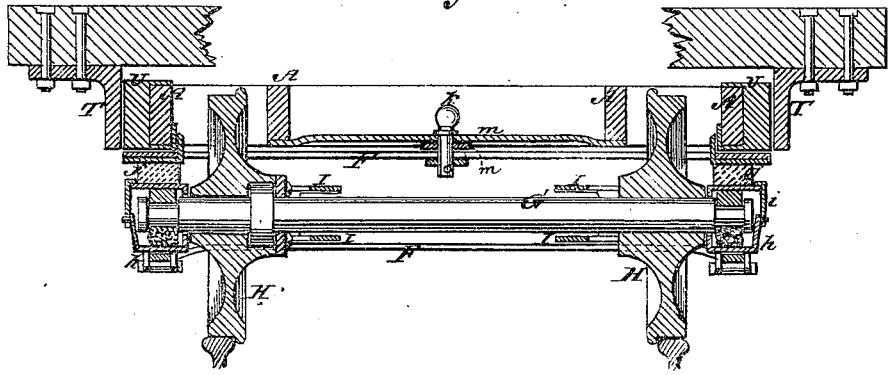

In the accompanying drawing, Figure 1 is a top view; Fig. 2, a bottom view; Fig. 3, a vertical longitudinal section; Fig. 4, a vertical cross-section at *x x;* and Fig. 5, a similar section at *y y*, Fig. 1, of one of my improved trucks; and in these several figures the same part will be found designated by the same letter of reference.

In Fig. 1 the truck is illustrated as having its axles set at right angles to the frame, while at Fig. 2 the frame is thrown out and the axles appear as they would be placed while turning a curve. I have not shown the platform or body of the car, (as its presence in the drawing would only tend to complicate them, and it is made about as usual, and its novel arrangement with or attachment to the truck can be readily understood from the explanations hereinafter made,) but have only illustrated, at Figs. 1 and 4, the means for holding the body sidewise on the truck.

In the several figures, A is the frame of the truck, between the two cross-beams B B' of which is suspended, by rods c and bottom plates d, the beam C, which indirectly supports the car-body. On this supporting-beam C are arranged the springs D, upon which rests the center-beam E, and on this center-beam is placed, in a manner which will be presently described, the platform or body of the car. The beam or segmental bar E is arranged between the cross-beams B B' in such a manner, with a vertical pivot at e and curved bearing-surface at f g, that it can freely oscillate about the said vertical pivot e as a center of motion, though it cannot move laterally, and the said beam E, with its pivot e and curved bearings f g, is also free to move vertically to an extent sufficient to correspond with the rise and fall of the body of the car, permitted by the action of the springs D. Beneath the frame A are located (one near each end) two auxiliary frames, F and F', to which are attached, as shown, the jaws h, which carry the journal-boxes i and usual rubber springs j. These last-named parts, together with the accompanying axles G and wheels H, are all made and arranged together in about the usual manner. These auxiliary frames F F' are pivoted, respectively, at k and l, to cross-bars m and n of the main truck-frame, and are free to turn on their said pivots, the main frame A resting, at the pivots and at the sides, on the said auxiliary frames. To the auxiliary frames F F' are attached suitable breaks o o, which may be made and operated in any approved manner. I I are two bars, which cross each other, one passing through the other, as shown, and the ends of which are pivoted to the two front corners of the forward frame F and the two rear corners of the back frame F' in such a manner as to cause any oscillatory or swiveling motion of one of said frames to be imparted to the other. L L are connecting-rods, the forward end of each of which is attached to the center-beam E, and the rear end of each of which is fastened in an upright box or stand, s, on the rear auxiliary frame F'. By means of this connection between the center-beam E and the rear frame F' these two parts are obliged to move simultaneously, and any motion of the center-beam E on its vertical axis causes an oscillation of the rear axle-frame F'. On the upper side or on top of the center-beam E is securely bolted, or otherwise provided, a segmental shoe-piece or grooved arc, P, adapted to receive a correspondingly-shaped projecting rib, secured to the transom on the under side of the platform or body of the car. The rib or projection so attached to the transom of the car-body, and which engages with the circular groove in P, may, of course, be either quite as long as, or of less length than, the piece P; the two should, however, so fit together and be of such length as to insure the retention together of the body and truck and a proper operation of the parts. To the under side of the car-body are bolted (one on each side) two stands, T T, (see Figs. 1 and 4,) or angle-irons, the vertical legs of which descend each side of the truck so as to embrace it near its forward end, as shown.

In the construction of my improved truck I have found the following rule the proper guide in practice for determining the degree of curvature to be given to the circular ways (the shoe-piece P and its mate on the car-body) on which the body rests: After having determined the distance apart that the trucks are to be located, draw the arcs illustrating the "sharpest curve"—that is, the circle of the shortest radius—over which it is contemplated the trucks are to travel, and draw the center lines of the axles to correspond with radiuses of said curve or circle; then through a point located at the middle of the forward axle of the foremost truck, and a point located at the middle of the rear axle of the hindmost truck, draw a right line; then find a point in this line forward of the front axle which is equidistant from the two points at which the two rails are intersected by the center line of the rear axle of the same truck, and this point will always be the proper one from which to strike the circle for the grooved way P. This groove must, of course, then be so located on the center-beam E as to induce to a distribution of the weight of the car about evenly on all the wheels. The legs of the stands T should embrace the truck at points just opposite the ends of the forward axle when the latter is set straight, or at right angles to the truck-frames. These legs hold the car laterally to the truck at these points, and at the same time leave the truck free to swivel. As they take their bearings on the outer curved surfaces of the castings U of the truck-frame, and as these curved surfaces of the plates U are concentric to the center of motion at k of the truck, the retaining legs T do not at all impede the swiveling of the truck.

After the foregoing general description of the construction of my improved truck and of the mode of combining the same with the car, those skilled will understand the operation to be about as follows: When the car is running on a straight track the trucks naturally follow it, and by the parallelism of the truck-frames with the tracks the several axles are held in positions or lines at right angles to the rails; but as soon as the wheels strike a curve the truck-frame swivels on a vertical axis of motion coincident with the forward pivot K, so as to have its rear end swing outward from the center of the curve, and this motion of the truck causes the curved rib, on which the car-body rests, and which matches into the curved groove of P, to slide in said groove; and since the circle or arc of said groove P is eccentric to the center of motion of the truck-frame, the center-beam E is turned on its center of oscillation and thereby the rear auxiliary frame F' and the other axle-frame F, to which F' is connected, are swiveled or oscillated, respectively, on the pivots $l$ and $k$ until the axles of the truck are placed just about in the lines or positions of radiuses to the curve being traversed. In leaving the curve and running into a straight portion of the track, by the same mode of operation the axles are swiveled back into a position parallel to each other, and at right angles to the rails of the track.

It will be understood that as the retaining-stand T embraces the curved portions of the truck-frame at U, and said portions are formed in arcs of a circle whose center is at $k$, the swiveling motion of the truck-frame is practically about an imaginary center of motion coincident with the center of pivot $k$.

I have found by practical tests that a car provided with such a truck as described, and combined therewith by means of the retaining-stands T and curved connections at P, as shown and explained, will run from straight into sharply-curved portions of the track with little or no perceptible motion, and under the same conditions pass from the curves into the straight portions, and that the axles will be placed readily, as described, no matter what may happen to be the degree of curvature of the arc over which the car may be passing.

In carrying out my invention many variations may be made in the form of parts and the details of construction without departing from the characteristic features which I have described as being essential; and less than all these features may be employed with advantage, though I prefer to embody them all, as described and shown.

Having so fully described the construction and operation of a truck embracing all my improvements, and the manner of its combination with a car body or platform, that those skilled can clearly understand and practice my invention, what I claim as new, and desire to secure by Letters Patent, is—

1. The construction of the truck and its arrangement with the car-body or platform substantially in the manner described, so that it can oscillate beneath the car about an axis of motion located near one end, as and for the purposes hereinbefore fully explained.

2. The combination, with the axle-boxes and the "jaws" in which they are held, of auxiliary frames located beneath the main truck-frame, and arranged to swivel or oscillate, substantially in the manner and for the purposes described.

3. The combination of one of the auxiliary or axle frames with the oscillating center-beam and suitable connection between them, substantially as and for the purposes described.

4. In combination with the truck-frame and the auxiliary or axle frames, which oscillate upon axes of motion different from that of the truck-frame, suitable means, as described, of connection between the two, so that any oscillatory motion of one will induce a corresponding oscillation of the other, in the manner set forth.

5. The use, in connection with the two oscillatory axle-frames, of pivoted bars or other suitable devices, which connect the most distant portions of the said frames, as and for the purposes described.

In testimony whereof I have hereunto set my hand and seal this 29th day of August, 1872.

WALTER YOUMANS. [L. S.]

In presence of—
  J. N. McINTIRE,
  JACOB FELBEL.